(12) United States Patent
Sasaki et al.

(10) Patent No.: US 7,815,368 B2
(45) Date of Patent: Oct. 19, 2010

(54) TEMPERATURE DETECTOR AND FIXING MATERIAL TRANSFER SUPPRESSING STRUCTURE

(75) Inventors: Kei Sasaki, Nagoya (JP); Akira Takasaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 297 days.

(21) Appl. No.: 11/886,265

(22) PCT Filed: Jan. 30, 2006

(86) PCT No.: PCT/JP2006/301916

§ 371 (c)(1),
(2), (4) Date: Sep. 13, 2007

(87) PCT Pub. No.: WO2006/100839

PCT Pub. Date: Sep. 28, 2006

(65) Prior Publication Data

US 2009/0232185 A1    Sep. 17, 2009

(30) Foreign Application Priority Data

Mar. 23, 2005 (JP) ............................. 2005-084371
Jun. 2, 2005 (JP) ............................. 2005-162760
Jul. 22, 2005 (JP) ............................. 2005-213306

(51) Int. Cl.
*G01K 1/00* (2006.01)
(52) U.S. Cl. ................ 374/152; 374/208; 374/141; 374/163; 310/68 C
(58) Field of Classification Search ............... 374/208, 374/163, 141, 152; 310/68 C
See application file for complete search history.

(56) References Cited

U.S. PATENT DOCUMENTS

| | | | | |
|---|---|---|---|---|
| 3,537,053 A | * | 10/1970 | Russell et al. | 338/25 |
| 5,343,613 A | * | 9/1994 | Kintz et al. | 29/596 |
| 6,081,056 A | * | 6/2000 | Takagi et al. | 310/89 |
| 6,153,954 A | * | 11/2000 | Uchida et al. | 310/68 C |
| 6,466,123 B1 | * | 10/2002 | Kuzuoka et al. | 338/25 |
| 2006/0165879 A1 | * | 7/2006 | Kimura et al. | 427/104 |
| 2007/0127552 A1 | * | 6/2007 | Bronnert | 374/185 |

FOREIGN PATENT DOCUMENTS

| | | |
|---|---|---|
| JP | U 58-184634 | 12/1983 |
| JP | A 59-96687 | 6/1984 |
| JP | A 6-70510 | 3/1994 |
| JP | A 7-142118 | 6/1995 |
| JP | A 8-214505 | 8/1996 |
| JP | A 9-135551 | 5/1997 |
| JP | A 9-190720 | 7/1997 |
| JP | A 10-94222 | 4/1998 |
| JP | A 10-247546 | 9/1998 |
| JP | A 2001-343292 | 12/2001 |
| JP | A 2002-78301 | 3/2002 |
| JP | A 2003-92858 | 3/2003 |
| JP | A 2005-65440 | 3/2005 |

* cited by examiner

*Primary Examiner*—Lisa M Caputo
*Assistant Examiner*—Mirellys Jagan
(74) *Attorney, Agent, or Firm*—Oliff & Berridge, PLC (57) ABSTRACT

The temperature detector comprises a thermistor embedded in varnish, a connector, a lead wire connecting the thermistor and the connector to each other, and a transfer suppressing portion provided between the thermistor and the connector and suppressing the movement of the varnish on the surface of the lead wire. The suppressing portion comprises a protection tube surrounding the lead wire and a grommet filled in a space inside the protection tube.

11 Claims, 7 Drawing Sheets

TEMPERATURE DETECTOR AND FIXING MATERIAL TRANSFER SUPPRESSING STRUCTURE

TECHNICAL FIELD

The present invention relates to a temperature detector and a fixing material transfer suppressing structure, and more particularly to a temperature detector having a connector and a fixing material transfer suppressing structure included in the same.

BACKGROUND ART

Lead wires having an element wire and an insulating coating portion have conventionally been known.

For example, Japanese Patent Laying-Open No. 09-135551 discloses that an end portion of a lead wire protection sleeve (insulating coating portion) is subjected to a sealing process so that penetration of varnish caused by capillarity is prevented. On the other hand, Japanese Patent Laying-Open No. 2002-078301 discloses that a coating removed portion is provided in a lead wire and a resin is filled in the portion in order to prevent penetration of varnish caused by capillarity.

Japanese Patent Laying-Open No. 2003-092858 discloses a structure for attaching a temperature detection element in which a temperature detection element fixed by a guide is inserted and fixed in a tunnel-like gap between a stator core of an electric motor and a coil end portion of a winding.

Japanese Patent Laying-Open No. 06-070510 discloses a method of embedding a temperature sensor including the steps of: inserting a dummy similar to the shape of a temperature sensor into a coil wound around a stator core; shaping a coil while the dummy is kept inserted; and embedding a temperature sensor in an empty hole formed by removing the dummy.

Japanese Patent Laying-Open No. 10-094222 discloses a structure of attaching a temperature detection element using a guide formed in a stator of an electric motor.

Japanese Patent Laying-Open No. 08-214505 discloses that a structural element responsive to a temperature is fixed by attaching an insulator to a stator and thereafter winding a stator coil.

Japanese Patent Laying-Open Nos. 07-142118 and 10-247546 disclose a rubber plug for a waterproof connector, which is inserted into a seal tubular portion of a waterproof connector with an electric wire passed therethrough, to hermetically seal a portion between an inner wall of the seal tubular portion and the electric wire. This rubber plug has a tubular member fitted with an electric wire and has an outer circumferential lip portion and an inner circumferential lip portion respectively formed annularly on the outer circumferential side and inner circumferential side thereof.

Japanese Patent Laying-Open No. 59-096687 discloses a method of insulating an electric wire connection portion. Here, a wiring connection portion is wrapped with a varnish tube and a heat-foaming sheet and coated thereon with a heat-shrinking tube and is then heated from the surface of the tube so that the heat-foaming sheet is foamed and the heat-shrinking tube is shrunken.

Japanese Patent Laying-Open No. 09-190720 discloses a lead wire in which an elongated flexible substrate having an interconnection pattern formed thereon along the longitudinal direction is surrounded with a tube having flexibility. Here, at least a space on the pattern formation face side of the flexible substrate is sealed by a flexible and insulative seal body.

A fixing material moving along on a surface of a lead wire is sometimes a problem. For example, when an element embedded in a fixing material and a connector are connected to each other by a lead wire, the fixing material at the time of impregnation may move along the lead wire and then reach the connector. When the fixing material hardens in the connector, troubles may occur in the device.

By contrast, the technique disclosed in Japanese Patent Laying-Open Nos. 09-135551 and 2002-078301 is to prevent a lead wire from hardening by suppressing penetration of a fixing material into a lead wire due to capillarity, and completely differs in prerequisites and configuration from the present invention which suppresses transfer of a fixing material on a lead wire surface. In other patent documents, no technique is disclosed that resolves the aforementioned problems.

DISCLOSURE OF THE INVENTION

An object of the present invention is to provide a temperature detector in which intrusion of a fixing material into a connector is suppressed, and a fixing material transfer suppressing structure included in the same.

A temperature detector in accordance with the present invention includes: a temperature detection element portion embedded in a fixing material; a connector portion; a lead wire connecting the temperature detection element portion and the connector portion to each other; and a transfer suppressing portion provided between the temperature detection element portion and the connector portion to suppress movement of the fixing material on a surface of the lead wire.

According to the above-noted configuration, it can be suppressed that the fixing material contained in the periphery of the temperature detection element portion moves on the surface of the lead wire to intrude into the connector portion.

The temperature detector as described above preferably further includes a lead wire protection portion provided between the temperature detection element portion and the transfer suppressing portion to protect the lead wire.

Thus, the lead wire embedded in the fixing material can be protected.

In the temperature detector as described above, preferably, the transfer suppressing portion has a tube surrounding the lead wire and a seal portion filling in a space inside the tube. The seal portion is preferably configured to include any one of a grommet, a heat-shrinkable tube and a seal agent.

Thus, the transfer suppressing portion can be configured with a simple structure.

In accordance with an aspect, the seal portion includes a seal member, and the seal member includes a through-hole through which a lead wire passes, and a slit extending from on a side surface of the seal member to the through-hole.

Thus, the lead wire can be inserted from the slit, so that attachment of the seal member to the lead wire can be carried out easily.

In accordance with another aspect, the seal portion includes a plate-like seal member. Then, the seal portion is formed by inserting the seal member into the tube in a state in which the seal member is wrapped around the lead wire.

Also in this aspect, attachment of the seal member to the lead wire can be carried out easily.

In the temperature detector as described above, preferably, the tube has shock absorbency.

Thus, the lead wire inside the tube can be protected against a shock at the time of installation of a member.

In accordance with a further aspect, the temperature detector as described above further includes a protection member surrounding the temperature detection element portion. Then, the seal portion is formed by inserting the protection member into the tube.

In this aspect, the seal portion is formed of a protection member. Then, exposure of the lead wire between the temperature detection element portion and the tube can be prevented.

Here, preferably, a protrusion portion is formed on a side surface of the protection member positioned on a side of the connector portion with respect to the temperature detection element portion.

Thus, it can be suppressed that the temperature detection element portion is covered with the tube.

A fixing material transfer suppressing structure in accordance with the present invention includes: a lead wire having one end portion embedded in a fixing material; a connector portion connected to the other end portion of the lead wire; and a transfer suppressing portion provided on the lead wire to suppress movement of the fixing material on a surface of the lead wire.

Thus, it can be suppressed that the fixing material moving on the surface of the lead wire intrudes into the connector portion.

As described above, in accordance with the present invention, intrusion of a fixing material into a connector can be suppressed. In particular, when a fixing process (varnish treatment) is performed on a core body having a temperature detector attached thereto, movement of a fixing material on a surface of a lead wire can be suppressed.

BEST MODES FOR CARRYING OUT THE INVENTION

In the following, embodiments of a temperature detector and a fixing material transfer suppressing structure based on the present invention will be described. It is noted that the same or corresponding parts will be denoted with the same reference characters and description thereof will not be repeated in some cases.

Figure 1:
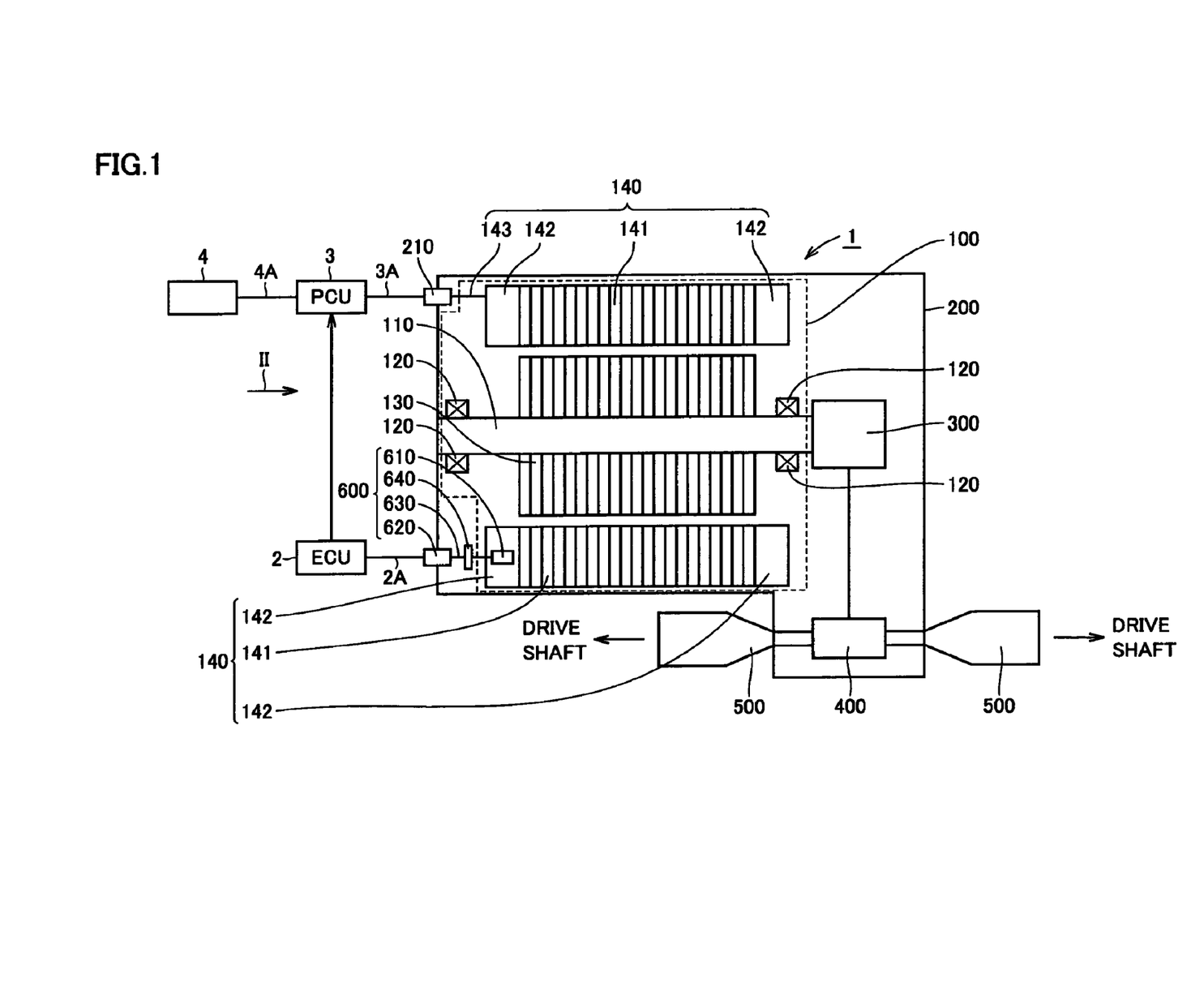
FIG. 1 is a diagram schematically showing an example of a drive unit including a temperature detector in accordance with first to fifth embodiments of the present invention and electric equipment connected to the drive unit.

FIG. 1 is a diagram schematically showing an example of a drive unit including a temperature detector in accordance with the first to fifth embodiments as described later and electric equipment connected to the drive unit. In the example shown in FIG. 1, a drive unit 1 is a drive unit mounted on a hybrid vehicle and is connected to an ECU (Electrical Control Unit) 2, a PCU (Power Control Unit) 3 and a battery 4.

Information indicating driving conditions and vehicle conditions are input from a variety of sensors to ECU 2 provided as a control device. The information indicating driving conditions includes an accelerator position sensor output, a wheel speed sensor output, a vehicle inclination sensor output, and the like. Furthermore, as vehicle conditions, temperature sensor/current sensor/rotational speed sensor outputs of a motor generator, and the like are input. ECU 2 performs a variety of control concerning the vehicle in an integrated manner based on these input information.

PCU 3 collectively shows a power converter required in a vehicle. More specifically, PCU 3 includes an inverter (not shown) converting direct-current power to alternating-current power, a DC-DC converter (not shown) converting a voltage level of direct-current voltage, and the like. The inverter converts direct-current power supplied from battery 4 into alternating-current power for driving a motor generator and converts alternating-current voltage generated when the motor generator is driven by an engine (not shown) or during a regenerative braking operation of the motor generator itself, into direct-current voltage for charging battery 4. The DC-DC converter has, for example, a function of converting direct-current voltage to a level suitable for power supply voltage for accessories such as an air conditioner. Between drive unit 1 and PCU 3 and between PCU 3 and battery 4, power cables 3A, 4A are respectively disposed to transmit power.

Now, a configuration of drive unit 1 will be described. Drive unit 1 is configured to include a motor generator 100, a housing 200, a speed reduction mechanism 300, a differential mechanism 400, and a drive shaft reception portion 500.

Motor generator 100 is an electric rotating machine having a function as an electric motor or a power generator and has a rotational shaft 110 rotatably attached to housing 200 through a bearing 120, a rotor 130 attached to rotational shaft 110, and a stator 140.

A rotor core which constitutes rotor 130 is formed of a magnetic material such as iron or iron alloy. Permanent magnets (not shown) are buried in the rotor core. The permanent magnets are arranged, for example, at approximately regular intervals in the vicinity of the outer circumference of the rotor core.

Stator 140 has a ring-like stator core 141, a coil wound around stator core 141, and a bus bar terminal 143 connected to a coil end 142 of the coil. Bus bar terminal 143 is connected to a terminal base 210 provided at housing 200. Terminal base 210 is connected to PCU 3 and battery 4 through power cables 3A, 4A.

Stator core 141 is formed by stacking plate-like magnetic materials such as iron or iron alloy. On the inner circumference of stator core 141, a plurality of teeth portions (not shown) and slot portions (not shown) as concave portions formed between the teeth portions are formed. The slot portions are provided to be open on the inner circumferential side of stator core 141.

The coil including U-phase, V-phase and W-phase as three winding phases is wrapped around the teeth portions to fit into the slot portions. U-phase, V-phase and W-phase of the coil are wrapped in such a manner as to be displaced from each other on the circumference. Bus bar terminal 143 includes a U-phase terminal, a V-phase terminal and a W-phase terminal respectively corresponding to the U-phase, the V-phase and the W-phase of the coil.

Coil end 142 is formed at opposite axial end portions of stator core 141. The periphery of coil end 142 and the coil windings in the slots is impregnated with varnish as a fixing material.

Power cable 3A is a three-phase cable comprised of a U-phase cable, a V-phase cable and a W-phase cable. The U-phase terminal, the V-phase terminal and the W-phase terminal in bus bar terminal 143 are respectively connected to the U-phase cable, the V-phase cable and the W-phase cable in power cable 3A.

Motive power output from motor generator 100 is transmitted from speed reduction mechanism 300 through differential mechanism 400 to drive shaft reception portion 500. The drive force transmitted to drive shaft reception portion 500 is transmitted through a drive shaft (not shown) to the wheels (not shown) as a rotational force to allow the vehicle to run.

On the other hand, at a time of regenerative braking of the hybrid vehicle, the wheels are rotated by the inertial force of the vehicle body. The rotational force from the wheels drives motor generator 100 through drive shaft reception portion 500, differential mechanism 400 and speed reduction mechanism 300. Here, motor generator 100 operates as a power generator. Electric power generated by motor generator 100 is stored in battery 4 through the inverter in PCU 3.

In order to sense overheating of coil end 142 during operation of drive unit 1, a temperature detector 600 is attached to motor generator 100. Temperature detector 600 has a thermistor 610 embedded in coil end 142, a connector portion 620, a lead wire 630 coupling thermistor 610 to connector portion 620, and a varnish transfer suppressing portion 640 provided on lead wire 630.

Thermistor 610 is configured, for example, to include a semiconductor and has a property of varying its electric resistance with a temperature increase. Furthermore, lead wire 630 has an element wire portion and an insulating coating portion coating around the element wire portion. During operation of drive unit 1, overheating of coil end 142 can be sensed by applying voltage to thermistor 610 and measuring its resistance.

Connector portion 620 is configured to include, for example, a connector including a caulking portion (fitting portion) and is connected to ECU 2 through connection wiring 2A. ECU 2 transmits a sensing result by temperature detector 600 to PCU 3. If it is sensed that the temperature of coil end 142 is excessively increased, electric power supply to motor generator 100 is suppressed by PCU 3, thereby preventing a failure.

Figure 2:
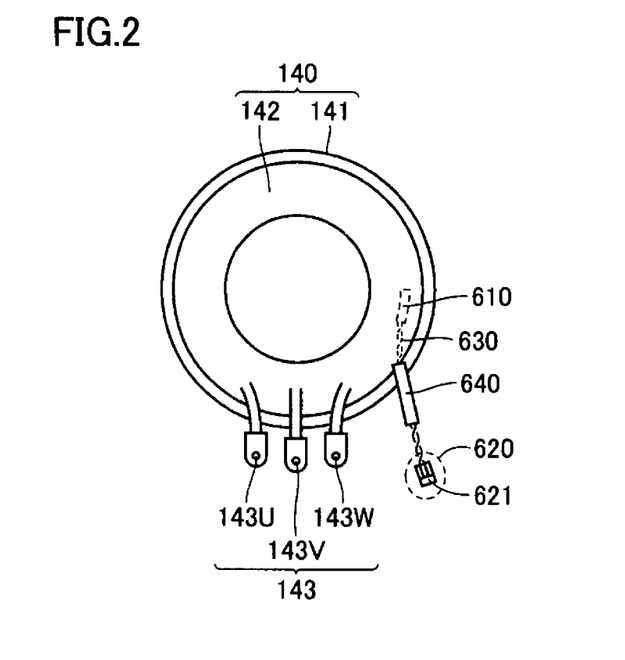
FIG. 2 is a plan view of a stator as viewed from a direction of arrow II in FIG. 1.

FIG. 2 is a plan view of the stator as viewed from the direction of arrow II in FIG. 1. Referring to FIG. 2, bus bar terminal 143 including a U-phase terminal 143U, a V-phase terminal 143V and a W-phase terminal 143W and a connector 621 forming a connector portion 620 come out from coil end 142 formed on the axial end surface of stator core 141. Transfer suppressing portion 640 is provided between thermistor 610 and connector 621. This prevents the varnish contained in coil end 142 from moving on the surface of the insulating coating portion of lead wire 630 to get into connector 621.

Figure 16:
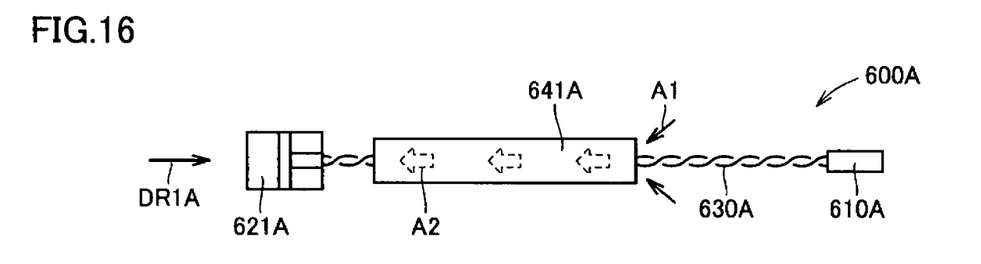
FIG. 16 is a view showing a temperature detector in accordance with a reference example.

FIG. 16 is a view showing a temperature detector 600A in accordance with a reference example. Referring to FIG. 16, temperature detector 600A in accordance with this reference example includes a thermistor 610A, a connector 621A, a lead wire 630A, and a protection tube 641A protecting lead wire 630A. A connector of connection wiring is fitted into connector 621A from the direction of arrow DR1A. Here, when thermistor 610A is embedded in varnish, the varnish may move along lead wire 630A to flow into protection tube 641A (arrow A1) and further travel in protection tube 641A toward connector 621A (arrow A2). As a result, the varnish intrudes into connector 621A.

As shown in FIG. 16, if varnish intrudes into the connector and gets into the caulking portion, caulking joining (fitting) of the connector cannot be carried out properly, or electrical continuity between the thermistor and external wiring may be inhibited. Accordingly, the function as a temperature detector is impaired. By contrast, the temperature detector in accordance with the first to fifth embodiments as described later eliminates such problems because of provision of varnish transfer suppressing portion 640.

First Embodiment

Figure 3:
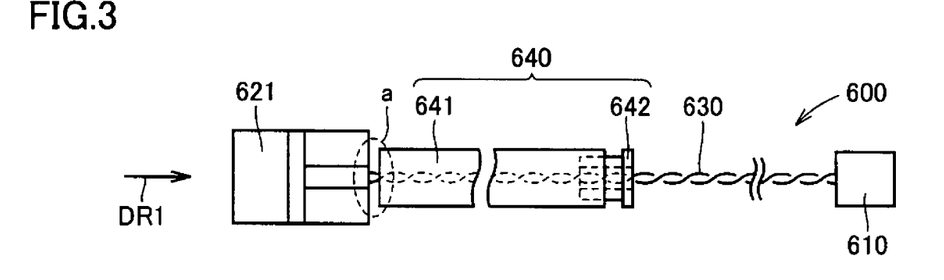
FIG. 3 is a view showing a temperature detector in accordance with the first embodiment of the present invention.

FIG. 3 is a view showing temperature detector 600 in accordance with the first embodiment of the present invention. Referring to FIG. 3, temperature detector 600 in accordance with the present embodiment includes thermistor 610, connector 621, lead wire 630, and varnish transfer suppressing portion 640. A connector of connection wiring (connection wiring 2A from ECU 2) is fitted into connector 621 from the direction of arrow DR1. Here, varnish transfer suppressing portion 640 has a protection tube 641 and a grommet 642.

Protection tube 641 is provided to surround lead wire 630 and prevents a damage on the insulating coating portion of lead wire 630. A material having relatively high oil-resistance and heat-resistance is used as protection tube 641. Grommet 642 is an electrical part generally widely used to seal the end portion of protection tube 641 on the thermistor 610 side. Thus, it is suppressed that varnish moving on the surface of lead wire 630 flows into protection tube 641. As a result, intrusion of varnish into connector 621 is prevented.

Furthermore, attaching grommet 642 to protection tube 641 allows the position of protection tube 641 to be fixed. Therefore, at the end portion on the connector 621 side (portion a in FIG. 3), it can be prevented that lead wire 630 is exposed and the insulating coating portion is damaged. In addition, protection tube 641 can be used as a length gauge, thereby simplifying adjustment of the buried length of lead wire 630 in the coil end.

In this manner, in accordance with temperature detector 600 in accordance with the present embodiment, it can be suppressed that varnish contained in the periphery of thermistor 610 moves on the surface of the insulating coating portion of lead wire 630 to intrude into connector 621.

The foregoing description is summed up as follows. Specifically, temperature detector 600 in accordance with the present embodiment includes thermistor 610 (temperature detection element portion) embedded in varnish (fixing material), connector 621, lead wire 630 connecting thermistor 610 to connector 621, and transfer suppressing portion 640 provided between thermistor 610 and connector 621 to suppress movement of varnish on the surface of lead wire 630.

Transfer suppressing portion 640 in temperature detector 600 has protection tube 641 (sleeve) surrounding lead wire 630 and grommet 642 (seal portion) filling in the space inside protection tube 641.

Figure 4:
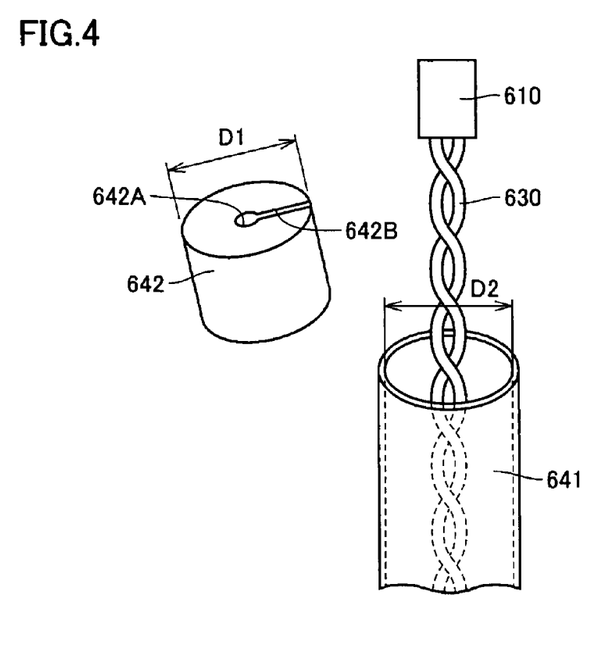
FIG. 4 is a view (1) illustrating a modification of the temperature detector in accordance with the first embodiment of the present invention.
Figure 5:
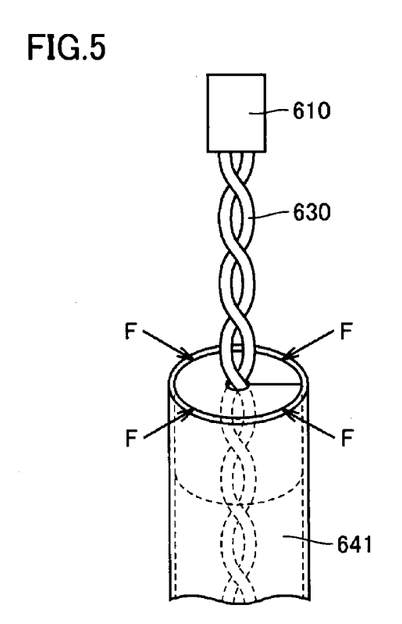
FIG. 5 is a view (2) illustrating a modification of the temperature detector in accordance with the first embodiment of the present invention.

FIG. 4, FIG. 5 are views illustrating a modification of the temperature detector having "seal portion".

Referring to FIG. 4, FIG. 5, one of the characteristics of "seal portion" in accordance with the present modification is in a shape of grommet 642 as a "seal member".

As shown in FIG. 4, grommet 642 has a through-hole 642A through which lead wire 630 passes and a slit 642B extending from a side surface of grommet 642 to through-hole 642A. Grommet 642 is attached to lead wire 630 by passing lead wire 630 through slit 642B. In this state, as shown in FIG. 5, grommet 642 (diameter D1) is inserted into protection tube 641 (inner diameter D2 (<D1)). Thus, the gap between lead wire 630 and protection tube 641 is hermetically sealed, thereby forming "seal portion".

Here, grommet 642 is formed, for example, of a material softer than protection tube 641, such as silicone rubber having a hardness of about 30° or sponge. By doing so, the grommet inserted in protection tube 641 is deformed by a force (F) received from the protection tube. Then, through-hole 642A is narrowed and intimate contact of protection tube 641 with lead wire 630 is enhanced. In addition, slit 642B is also hermetically sealed. Thus, the effect of preventing intrusion of varnish into protection tube 641 is further enhanced. In addition, provision of slit 642B facilitates attachment of grommet 642 to lead wire 630. As a result, the manufacturing costs are reduced.

Figure 6:
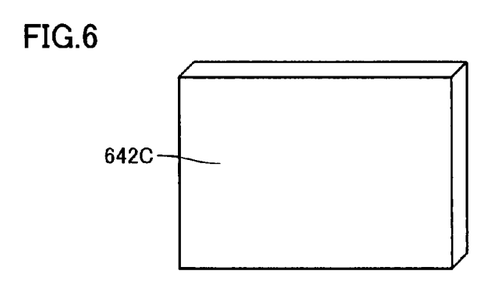
FIG. 6 is a view (1) illustrating another modification of the temperature detector in accordance with the first embodiment of the present invention.
Figure 7:
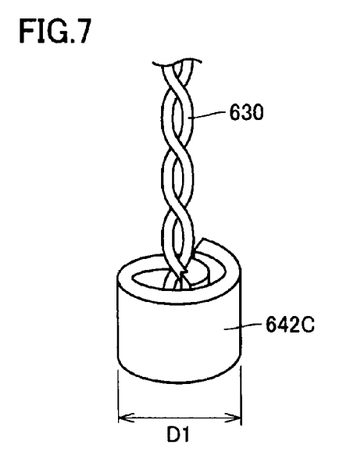
FIG. 7 is a view (2) illustrating another modification of the temperature detector in accordance with the first embodiment of the present invention.
Figure 8:
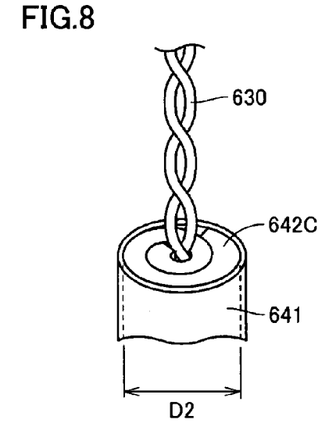
FIG. 8 is a view (3) illustrating another modification of the temperature detector in accordance with the first embodiment of the present invention.

FIG. 6-FIG. 8 are views illustrating another modification of the temperature detector having "seal portion". Referring to FIG. 6-FIG. 8, "seal portion" in accordance with the present modification is formed of a plate-like member 642C.

First, as shown in FIG. 6, plate-like member 642C is prepared. Plate-like member 642C is formed of a material softer than protection tube 641, such as closed-cell silicone sponge. Then, on the opposite faces of plate-like member 642C, adhesive layers are formed. In other words, plate-like member 642C is of "double-sided tape design". Next, as shown in FIG. 7, plate-like member 642C is wrapped around lead wire 630 and fixed. In addition, as shown in FIG. 8, plate-like member 642C (diameter: D1) wrapped around lead wire 630 is inserted into protection tube 641 (inner diameter: D2 (<D1)). Thus, the gap between lead wire 630 and protection tube 641 is hermetically sealed, thereby forming "seal portion".

Although in the present embodiment, description has been made to the example in which grommet 642 is attached to the end portion of protection tube 641 on the thermistor 610 side, grommet 642 may be attached to the end portion of protection tube 641 on the connector 621 side.

As for the description above, in other words, the fixing material transfer suppressing structure of temperature detector 600 in accordance with the present embodiment includes lead wire 630 having one end portion embedded in varnish, connector 621 connected to the other end portion of lead wire 630, and transfer suppressing portion 640 provided on lead wire 630 to suppress movement of varnish on the surface of lead wire 630.

Furthermore, in the example shown in FIG. 4, FIG. 5, grommet 642 as a "seal member" forming "seal portion" includes through-hole 642A through which lead wire 630 passes and slit 642B extending from on the side surface of grommet 642 to through-hole 642A.

On the other hand, in the example shown in FIG. 6-FIG. 8, "seal portion" includes plate-like member 642C as a "seal member". Then, "seal portion" is formed by inserting plate-like member 642C into protection tube 641 in the state in which plate-like member 642C is wrapped around lead wire 630.

It is noted that although in the present embodiment, application of the aforementioned fixing material transfer suppressing structure to the temperature detector has been described, application of the present structure to any other device is intended as a matter of course.

Second Embodiment

Figure 9:
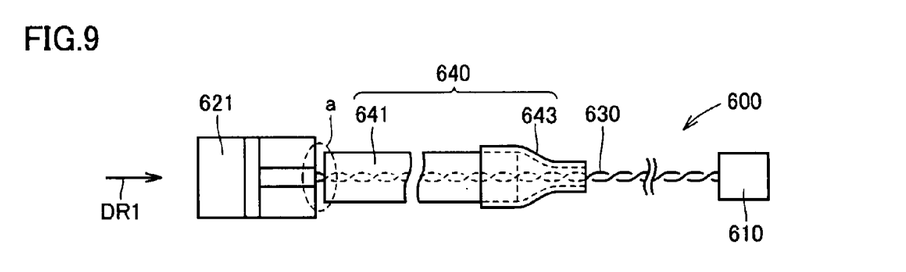
FIG. 9 is a view showing a temperature detector in accordance with the second embodiment of the present invention.

FIG. 9 is a view showing temperature detector 600 in accordance with the second embodiment. Referring to FIG. 9, temperature detector 600 in accordance with the present embodiment is a modification of the temperature detector in accordance with the first embodiment and is characterized in that transfer suppressing portion 640 has protection tube 641 and a heat-shrinkable tube 643. In other words, in the present embodiment, heat-shrinkable tube 643 forms "seal portion".

Heat-shrinkable tube 643 seals the end portion of protection tube 641 on the thermistor 610 side. Thus, it is suppressed that varnish moving on the surface of lead wire 630 flows into protection tube 641. As a result, intrusion of varnish into connector 621 is prevented.

In this manner, also in the present embodiment, similarly to the first embodiment, intrusion of varnish into the connector can be suppressed with a simple structure.

Third Embodiment

Figure 10:
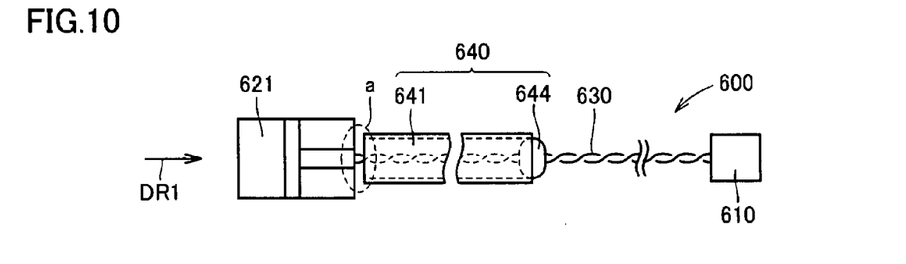
FIG. 10 is a view showing a temperature detector in accordance with the third embodiment of the present invention.

FIG. 10 is a view showing temperature detector 600 in accordance with the third embodiment. Referring to FIG. 10, temperature detector 600 in accordance with the present embodiment is a modification of the temperature detector in accordance with the first and second embodiments and is characterized in that transfer suppressing portion 640 has protection tube 641 and a seal agent 644. In other words, in the present embodiment, seal agent 644 forms "seal portion".

Seal agent 644 is configured to include, for example, liquid gasket (FIPG: Formed In Place Gasket), silicone rubber, resin, or the like, and seals the end portion of protection tube 641 on the thermistor 610 side. Thus, it is suppressed that varnish moving on the surface of lead wire 630 flows into protection tube 641. As a result, intrusion of varnish into connector 621 is prevented.

Figure 11:
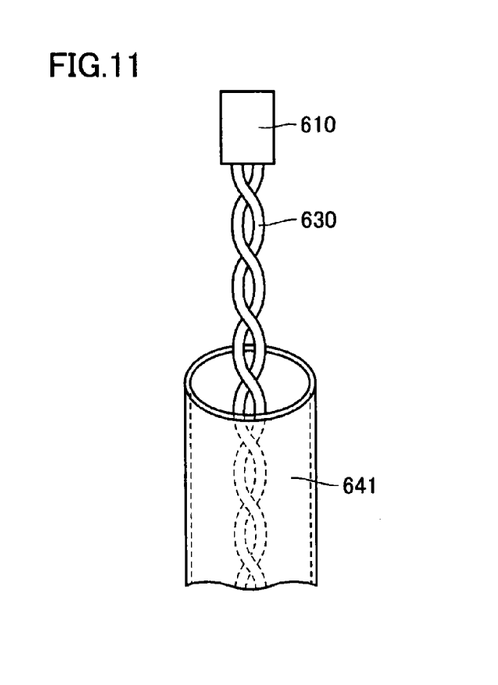
FIG. 11 is a view (1) illustrating a fabrication process of the temperature detector shown in FIG. 10.
Figures 12, 13:
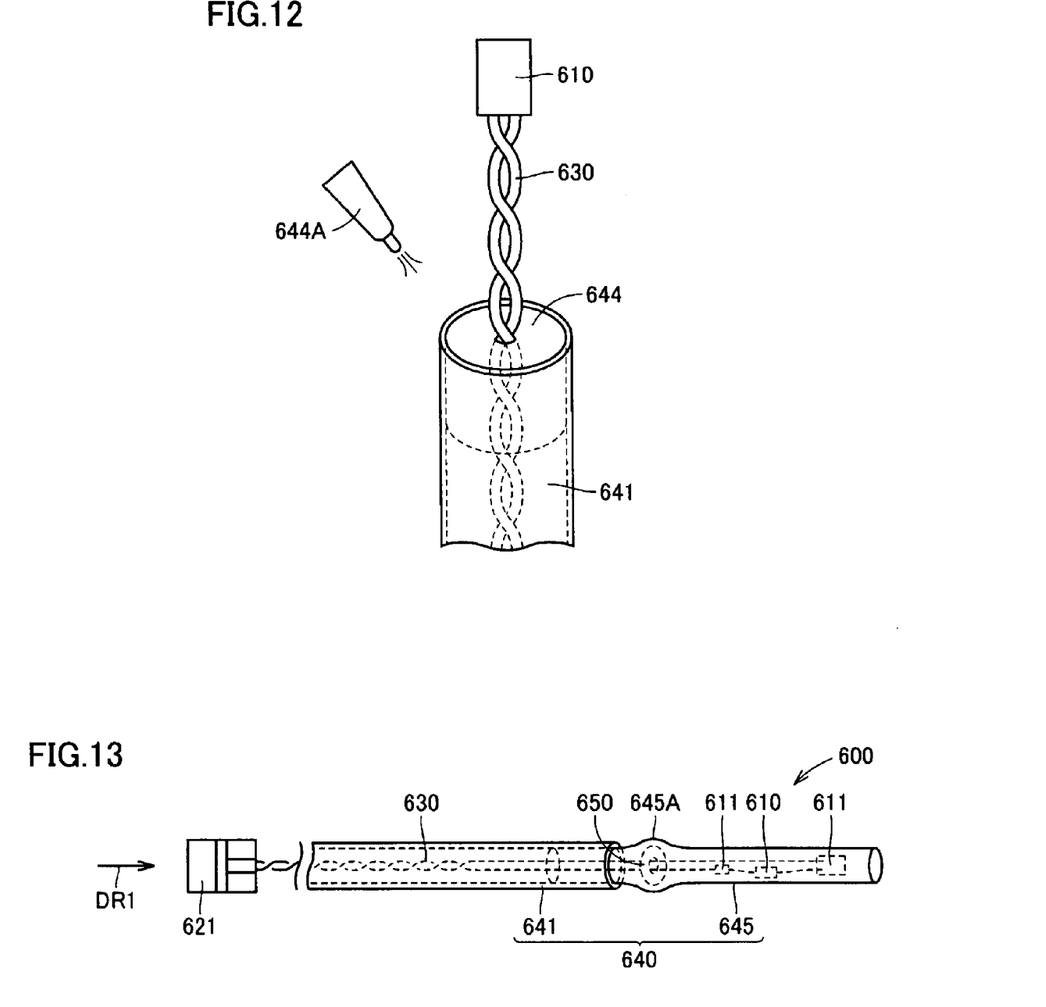
FIG. 12 is a view (2) illustrating a fabrication process of the temperature detector shown in FIG. 10.
FIG. 13 is a view showing a temperature detector in accordance with the fourth embodiment of the present invention.

FIG. 11, FIG. 12 are views illustrating a fabrication process of the temperature detector in accordance with the present embodiment.

First, as shown in FIG. 11, lead wire 630 is passed through protection tube 641. Then, as shown in FIG. 12, a portion between lead wire 630 and the inner circumferential surface of protection tube 641 is hermetically sealed by discharging seal agent 644 from a seal agent tube 644A. Thus, "seal portion" is formed. In addition, lead wire 630 and protection tube 641 are fixed, thereby preventing displacement of protection tube 641.

As described above, also in the present embodiment, similarly to the first and second embodiments, intrusion of varnish into the connector can be suppressed with a simple structure.

Fourth Embodiment

FIG. 13 is a view showing temperature detector 600 in accordance with the fourth embodiment. Referring to FIG. 13, temperature detector 600 in accordance with the present embodiment is a modification of the temperature detector in accordance with the first to third embodiments and is characterized in that transfer suppressing portion 640 has protection tube 641 and a protection member 645 provided to surround thermistor 610. In other words, in the present embodiment, protection member 645 forms "seal portion".

Protection member 645 is formed, for example, of a high heat-resistant Teflon (R) tube. After thermistor 610 connected to lead wire 630 through a connection portion 611 is inserted into the Teflon tube, protection member 645 surrounding thermistor 610 is formed by heat-shrinking the Teflon tube. Then, the end portion of protection tube 641 on the thermistor 610 side is sealed by inserting protection member 645 into protection tube 641. Thus, it is suppressed that varnish flows into protection tuber 641. As a result, intrusion of varnish into connector 621 is prevented. In addition, exposure of lead wire 630 between thermistor 610 and protection tube 641 can be suppressed. Moreover, as compared with a grommet or the like, protection member 645 can be formed to be thinner, and therefore, the diameter of protection tube 641 can be reduced by forming a "seal portion" with protection member 645.

Here, a ring 650 is attached to lead wire 630 positioned inside protection member 645. Thus, a protrusion portion 645A is formed on the side surface of protection member 645 that is positioned on the connector 621 side with respect to thermistor 610. Since protrusion portion 645A serves as a stopper when protection member 645 is inserted into protection tube 641, it can be suppressed that protection member 645 is excessively inserted and thermistor 610 is then covered with protection tube 641.

Furthermore, in the present embodiment, since lead wire 630 positioned on the outside of protection tube 641 is covered with protection member 645, lead wire 630 at that portion can be protected. In other words, in the present embodiment, protection member 645 forms "lead wire protection portion".

As described above, also in the present embodiment, similarly to the first to third embodiments, intrusion of varnish into the connector can be suppressed with a simple structure.

Fifth Embodiment

Figure 14:
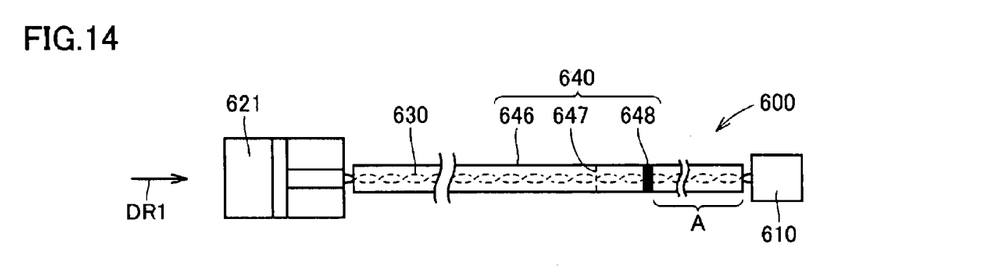
FIG. 14 is a view showing a temperature detector in accordance with the fifth embodiment of the present invention.

FIG. 14 is a view showing a temperature detector in accordance with the fifth embodiment. Referring to FIG. 14, temperature detector 600 in accordance with the present embodiment is a modification of the temperature detector in accordance with the first to fourth embodiments and is characterized in that transfer suppressing portion 640 has an electric wire protection tube 646 extending to the vicinity of thermistor 610, a heat-shrinkable tube 647 provided inside electric wire protection tube 646, and a potting agent 648 (seal agent) provided at the end portion of heat-shrinkable tube 647 on the thermistor 610 side. In other words, in the present embodiment, heat-shrinkable tube 647 and potting agent 648 form "seal portion". In addition, electric wire protection tube 646 extends to the thermistor 610 side farther from "seal portion", so that lead wire 630 at this portion can be protected. In other words, in the present embodiment, the portion (portion A in FIG. 14) positioned between heat-shrinkable tube 647 and thermistor 610 in electric wire protection tube 646 forms "lead wire protection portion". It is noted that electric wire protection tube 646 positioned in portion A in FIG. 14 is embedded in coil end 142. Therefore, the outer diameter of electric wire protection tube 646 is preferably, for example, 3 mm or less.

Figure 15:
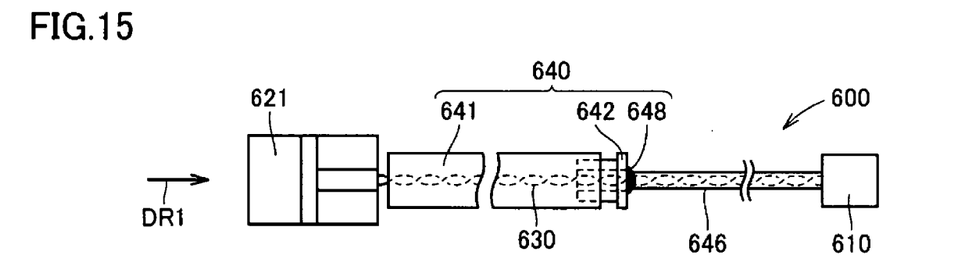
FIG. 15 is a view showing a modification of the temperature detector in accordance with the fifth embodiment of the present invention.

FIG. 15 is a view showing a modification of the temperature detector in accordance with the present embodiment. Referring to FIG. 15, the present modification is characterized in that transfer suppressing portion 640 has protection tube 641, grommet 642, and potting agent 648 (sealing agent) provided on grommet 642. In other words, in the present modification, grommet 642 and potting agent 648 form "seal portion". In addition, lead wire 630 positioned between "seal portion" and thermistor 610 is covered with electric wire protection tube 646. In this way, similarly as described above, lead wire 630 at this portion can be protected. In other words, in the present modification, electric wire protection tube 646 positioned between grommet 642 and potting agent 648 and thermistor 610 forms "lead wire protection portion".

Here, protection tube 641 is formed, for example, of a glass sleeve or the like and has shock absorbency. In this way, when components of motor generator 100 are installed, lead wire 630 can be protected from a shock which is caused, for example, when lead wire 630 gets caught between members.

Although the embodiments of the present invention have been described above, it is initially intended that the characteristic parts of the forgoing embodiments are combined as appropriate. Furthermore, it should be understood that the embodiments disclosed herein are illustrative rather than limitative in all respects. The scope of the present invention is shown by the claims, and it is intended that equivalents to the claims and all modifications within the claims are embraced.

INDUSTRIAL APPLICABILITY

As described above, the present invention is applied to a temperature detector and a fixing material transfer suppressing structure.

The invention claimed is:

1. A temperature detector comprising:
   a temperature detection element portion directly embedded in a coil end of a stator core and a fixing material with which said coil end is impregnated;
   a connector portion;
   a lead wire connecting said temperature detection element portion and said connector portion to each other; and
   a transfer suppressing portion provided between said temperature detection element portion and said connector portion to suppress movement of said fixing material on a surface of said lead wire, wherein
   said transfer suppressing portion has
   a tube surrounding said lead wire and
   a seal portion filling in a space inside said tube.

2. The temperature detector according to claim 1, further comprising a lead wire protection portion provided between said temperature detection element portion and said transfer suppressing portion to protect said lead wire.

3. The temperature detector according to claim 1, wherein said connector portion is attached on an outside of said tube.

4. The temperature detector according to claim 1, wherein said seal portion includes any one of a grommet, a heat-shrinkable tube and a seal agent.

5. The temperature detector according to claim 1, wherein said tube has shock absorbency.

6. The temperature detector according to claim 1, wherein
said seal portion includes a seal member inserted into said tube, and
said seal member is formed of a material softer than said tube.

7. The temperature detector according to claim 1, wherein said seal portion is provided on an end portion of said tube on a side of said temperature detection element portion.

8. The temperature detector comprising:
a temperature detection element portion embedded in a fixing material;
a connector portion;
a lead wire connecting said temperature detection element portion and said connector portion to each other;
a transfer suppressing portion provided between said temperature detection element portion and said connector portion to suppress movement of said fixing material on a surface of said lead wire, wherein
said transfer suppressing portion has
a tube surrounding said lead wire and
a seal portion filling in a space inside said tube; and
a protection member surrounding said temperature detection element portion, wherein
said seal portion is formed by inserting said protection member into said tube.

9. The temperature detector according to claim 8, wherein a protrusion portion is formed on a side surface of said protection member positioned on a side of said connector portion with respect to said temperature detection element portion.

10. The temperature detector comprising:
a temperature detection element portion embedded in a fixing material;
a connector portion;
a lead wire connecting said temperature detection element portion and said connector portion to each other; and
a transfer suppressing portion provided between said temperature detection element portion and said connector portion to suppress movement of said fixing material on a surface of said lead wire, wherein
said transfer suppressing portion has
a tube surrounding said lead wire and
a seal portion filling in a space inside said tube,
said seal portion includes a seal member, and
said seal member includes a through-hole through which a lead wire passes, and a slit extending from a side surface of said seal member to said through-hole.

11. The temperature detector comprising:
a temperature detection element portion embedded in a fixing material;
a connector portion;
a lead wire connecting said temperature detection element portion and said connector portion to each other; and
a transfer suppressing portion provided between said temperature detection element portion and said connector portion to suppress movement of said fixing material on a surface of said lead wire, wherein
said transfer suppressing portion has
a tube surrounding said lead wire and
a seal portion filling in a space inside said tube,
said seal portion includes a plate-like seal member, and
said seal portion is formed by inserting the seal member into said tube in a state in which said seal member is wrapped around said lead wire.

* * * * *